United States Patent
Fiala

[15] 3,704,032
[45] Nov. 28, 1972

[54] ACTUATING MEANS FOR INFLATING A VEHICULAR CRASH-PAD

[72] Inventor: Ernst Fiala, Berlin, Germany

[73] Assignee: Wolf-Dieter Klink, Lindbach, Germany

[22] Filed: Nov. 5, 1970

[21] Appl. No.: 87,203

[30] Foreign Application Priority Data

Nov. 6, 1969  Germany..........P 19 56 505.0

[52] U.S. Cl. ..................280/150 AB, 137/38, 222/3, 222/5
[51] Int. Cl.............................................B60r 21/08
[58] Field of Search........280/150 AB; 222/1, 3, 500; 9/316; 141/19; 137/38

[56] References Cited

UNITED STATES PATENTS

| | | |
|---|---|---|
| 2,755,125 | 7/1956 | Hodges.....................280/150 |
| 975,958 | 11/1910 | Johnson.....................222/500 |
| 2,850,291 | 9/1958 | Ziccardi.....................280/150 |
| 3,197,234 | 7/1965 | Bertrand.....................280/150 |

Primary Examiner—Kenneth H. Betts
Attorney—Curt M. Avery, Arthur E. Wilfond, Herbert L. Lerner and Daniel J. Tick

[57] ABSTRACT

An actuating means for inflating an inflatable crash pad by releasing high pressure from a tank, the crash pad being attached to the tank comprises a means responsive to the speed of the vehicle for releasing the high pressure to fill the inflatable crash pad, the actuating means being located within the tank. An eccentrically connected rotatable release member is provided between the tank and crash pad and is moved from a normally closed position when the vehicle experiences a predetermined amount of deceleration.

13 Claims, 3 Drawing Figures

ACTUATING MEANS FOR INFLATING A VEHICULAR CRASH-PAD

My invention relates to an actuating means for an inflatable crash pad, and more particularly, to an inflatable crash pad to be used in vehicles and the like.

Modern vehicles travel at such speeds that accidents frequently cause serious injuries. To eliminate and minimize such injuries, modern vehicles are equipped with padding throughout the passenger portion such as on the instrument panel and the like. It has been found that such protective padding is insufficient in preventing serious injuries, such as when a passenger is thrown against the hard surfaces within the vehicle. To alleviate these injuries, crash pads have been designed which are inflatable and, upon the sudden deceleration of a vehicle, inflate. In my co-pending patent application filed on Oct. 26, 1970, Ser. No. 84,054, an inflatable crash pad is disclosed which is suitable for being placed on hard surfaces within a vehicle such as the steering wheel, roof, front dashboard and instrument panel. This crash pad expands and inflates very rapidly when a significant deceleration is sensed. Such rapid volumetric increase is achieved through the use of a gas maintained under constant high pressure. The gas is released when the deceleration is sensed thus inflating the crash pad. The actuating means for inflating the crash pad must operate reliably to eliminate the possibility that the crash pad might be inadvertently actuated. Further, the actuating means or release mechanism preferably should be located within the pressure tank to eliminate the need for protecting the mechanism against malfunction due to inadvertent contact with other portions of the vehicle or the passengers.

An object of my invention is to provide an improved actuating means which is sensitive to the speed of a vehicle.

Another object of my invention is to provide such an actuating means which operates reliably and prevents inadvertent actuation.

Still another object of my invention is to locate the actuating means within the pressure tank.

Yet another object of my invention is to provide such an actuating means which is relatively simple in operation and easy to assemble.

Other objects, advantages and features of my invention will be made more apparent from the following description.

In accordance with the principles of my invention, the above objects are accomplished by providing an actuating means or release mechanism located within the pressure tank and operated upon the sensing of a significant change in the speed of the vehicle. The actuating means is provided with a trip block normally in one position attached to a lever which is connected to a release member eccentrically located in a cover member of the pressure tank. Upon displacement of the trip block, the eccentric mechanism causes the release member to begin opening releasing gas to inflate the crash pad. The opening increases rapidly until its motion is stopped. A pin member is securely threaded to the body of the pressure tank or container to maintain the weight in its initial position while the pressure tank is being placed within the vehicle. After so placed, the pin is loosened and maintained in position by means of a prebiased spring member which becomes depressed upon a significant change in the speed of the vehicle, thus enabling the trip block to be displaced in position.

The invention will be further described with reference to the embodiments thereof, illustrated by way of example in the accompanying drawings in which.

Figure 1:
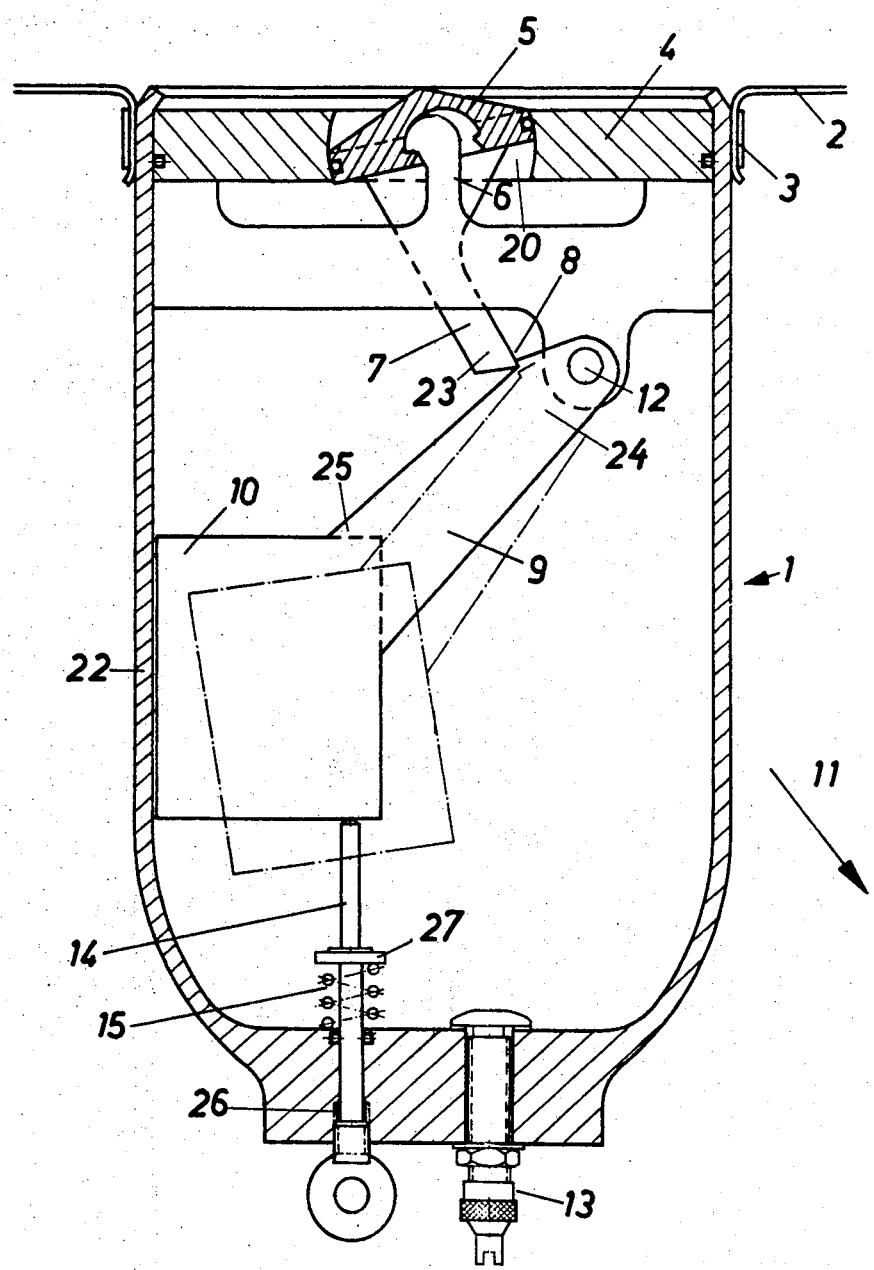
FIG. 1 is a sectional view through a pressure tank illustrating an embodiment of the invention.
Figure 2:
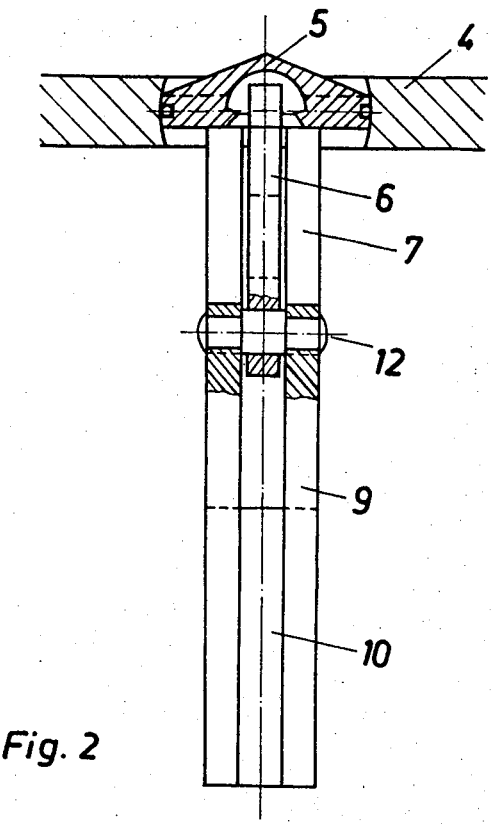
FIG. 2 is a sectional view taken perpendicular to the sectional view of FIG. 1.

Referring to the illustrations, particularly to FIGS. 1 and 2, a pressure tank 1 is illustrated having an inflatable crash pad 2 attached to the top of the pressure tank 1 by means of a strap 3 encircling the body 22 of the tank 1. The inflatable crash pad 2 is disclosed more fully in my co-pending patent application referred to above. The inflatable crash pad generally is maintained in a compressed position prior to its being actuated and, when actuated, is quickly inflated or expanded volumetrically to provide a soft cushion against which a person in the vehicle may safely be thrown without causing injury. The pad 2 is mounted to hard surfaces within the passenger compartment of the vehicle such as on the steering wheel, the roof or dashboard. Additionally, the crash pad may be mounted so as to prevent someone in the vehicle from being thrown against any of the windows thereof. On the top surface of the pad, facing the interior of the vehicle, an additional protective cushioned pad is provided which is filled with such materials as foam or fabric.

The top open end of the pressure tank or container 1 is closed by means of a cover member 4 having a throughbore 20 concentrically aligned with the body 22 of the container or tank 1. A rotatable release member 5 fits flush against the sides of the bore 20 and is supported on an eccentric support 6. The release member is additionally supported by a lever 7 having its lower end 23 resting in a notch 8 formed in the upper end 24 of a connecting lever member 9. A weighted block 10 is attached to the other end 25 of lever member 9 and is displaceable from an initial position. Lever 9 is rotatable about a bearing 12 at its upper end 24.

In the embodiment shown in FIG. 1, the direction of travel is approximately indicated by arrow 11 and lever member 9 is set perpendicular to the direction of travel. When the vehicle decelerates, the trip block 10 is displaced from position, releasing lever 9 from notch 8 which, due to the eccentric setting of support 6 and the internal pressure in tank 1, causes the cover 5 to rotate counter-clockwise opening the hole in the top of cover member 4. Due to the oblique setting of release member 5, the cross-sectional area presented for the escape of high pressure gas within tank 1 increases as the cover continues to open. This gas, maintained under high pressure, fills the inflatable crash pad 2 enlarging its volume. The lever 7 strikes against the bottom of cover 4, terminating the motion of release member 5, allowing the bore area 20 to remain open. A valve 13 is provided for filling the pressure tank and is located in the bottom of tank 1.

In order to prevent an erroneous and inadvertent displacement of block 10 prior to the installation of the present apparatus in the vehicle, a threaded pin 14 is threaded in a threaded recess 26 located in the bottom of block 10 maintaining it in its initial position. After the apparatus is properly assembled in the vehicle, the threads of pin 14 are retracted from the bottom of block 10 and the axial pressure on the screw is changed through the change in speed of the vehicle. A spring member 15 is located beneath pin 14 bearing against a shoulder 27 maintaining the pin abutting against the bottom of block 10. The spring 15 serves as a bias to set the predetermined amount of deceleration required to displace trip block 10.

The oblique initial setting of releasable member 5 enables the spring to provide an indication of the pressure within the tank. The internal pressure acts against member 5 pushing down on lever 7 which is transferred through lever 9 to block 10. Block 10 presses against pin 14 tending to push it outwardly, and the length of the projecting portion of pin 14 is indicative of the pressure in the tank 1.

Figure 3:
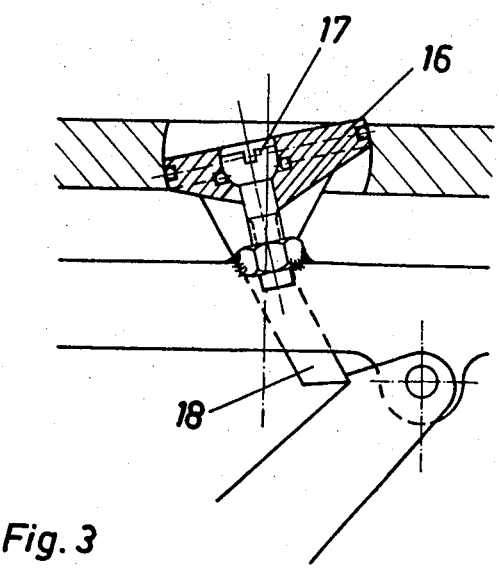
FIG. 3 is a sectional view similar to FIG. 1 showing another embodiment of the invention.

FIG. 3 illustrates another embodiment of the releasable member used with my invention. In FIG. 3, the releasable member 16 is secured eccentrically through a screw 17, which terminates in a brace 18 similar to lever 7 of FIG. 1. The brace 18 terminates in a notch similar to notch 8 of FIG. 1 and operates in a manner similar to that described with respect to the embodiment shown in FIG. 1.

The weight 10 is displaced generally about 10 millimeters or three-eighths of an inch, but any other displacement distance may be suitably chosen. By minimizing the displacement, minimum wear and inertial considerations become involved in the design of my apparatus. In accordance with a feature of my invention, the biasing spring 15 is mounted through the bottom of tank 1 so as to be away from the top cover 4 of the tank. The pressure tank 1 may be enclosed totally within the crash pad 2 so as to be nonaccessible to external forces.

It will thus be seen that the objects set forth above, among those made apparent from the preceding description, are efficiently attained and, since certain changes may be made in the above apparatus without departing from the scope of the invention, it is intended that all matter contained in the above description and shown in the accompanying drawings shall be interpreted as illustrative and not in a limiting sense.

I claim:

1. An actuating means for inflating an inflatable crash pad by releasing high pressure from a tank, said crash pad being attached to said tank comprising means responsive to the speed of a vehicle for releasing said high pressure to fill said inflatable crash pad, said actuating means being located within said tank, a cover member for covering said tank provided with a throughbore, a rotatable release member eccentrically connected within said throughbore and normally being in a closed position blocking air pressure in said tank from inflating said crash pad, said release member being rotated to an open position when the vehicle experiences a predetermined amount of deceleration, a support lever having two ends, one of said two ends of said support lever being connected to said release member, a connecting lever member having two ends, a notch being formed on one of said two ends of said connecting lever member, the other of said two ends of said lever resting in said notch when said release member is in said closed position, a trip block connected to the other of said two ends of said connecting lever member being in an initial position when said release member is in said closed position and being displaced when said predetermined amount of deceleration is experienced by said vehicle, said lever member being released from said notch and said release member moving to an open position when said trip block is displaced.

2. An actuating means as set forth in claim 1 comprising a threaded pin, said tank including a body having a threaded recess in the bottom of said body, said threaded pin communicating with said threaded recess to maintain said pin abutting against said trip block for fixing said trip block in said initial position.

3. An actuating means as set forth in claim 2 comprising a spring member axially aligned around said pin, said pin being provided with a shoulder and said spring member being located between said shoulder and the bottom of said body of said tank, said pin being removed from communication with said threaded recess after said tank is installed in said vehicle, said spring member exerting a predetermined amount of force against said trip block to maintain said trip block in said initial position until said vehicle experiences said predetermined amount of deceleration.

4. An actuating means as set forth in claim 3, wherein said pin is movable outwardly from said body responsive to the amount of pressure within said tank after said pin is removed from communicating with said threaded recess.

5. An actuating means as set forth in claim 1, wherein said connecting lever member is disposed substantially perpendicular to the direction of travel of said vehicle.

6. An actuating means as set forth in claim 1, wherein said crash pad is secured to the top of said tank by means of a connecting strap.

7. An actuating means as set forth in claim 1, wherein said release member is secured eccentrically by a screw.

8. An actuating means as set forth in claim 1, comprising a valve communicating with said tank to maintain a predetermined amount of pressure within said tank.

9. An actuating means according to claim 1 wherein said crash pad, at a side thereof facing away from said tank, is padded with a material selected from the group consisting of foam or fiber materials.

10. An actuating means according to claim 1, including force-limiting means for bracing said trip block against said tank in addition to the bracing thereof by means of said notch.

11. An actuating means according to claim 10 wherein said force-limiting means comprises a spring.

12. An actuating means according to claim 1 wherein said trip block is displaceable approximately 10 mm relative to said tank until it is tripped.

13. An actuating means according to claim 1 wherein said tank is located entirely within said crash pad.

* * * * *